(12) United States Patent
Thomas

(10) Patent No.: US 6,212,863 B1
(45) Date of Patent: Apr. 10, 2001

(54) LAWN MOWER ADJUSTMENT MECHANISM

(75) Inventor: Roger Thomas, Cleveland (GB)

(73) Assignee: Black & Decker Inc., Newark, DE (US)

( * ) Notice: Subject to any disclaimer, the term of this patent is extended or adjusted under 35 U.S.C. 154(b) by 0 days.

(21) Appl. No.: 09/334,322

(22) Filed: Jun. 16, 1999

(30) Foreign Application Priority Data

Jun. 16, 1998 (GB) .................................................. 9812934

(51) Int. Cl.$^7$ .................................................. A01D 34/63

(52) U.S. Cl. .................................................. 56/17.2; 56/16.7

(58) Field of Search .................................. 56/16.7, 17.1, 56/17.2, 201, 322; 16/18 R, 32, 33, 34, 35 R

(56) References Cited

U.S. PATENT DOCUMENTS

| | | |
|---|---|---|
| 2,523,439 | 9/1950 | May . |
| 2,568,822 * | 9/1951 | Pervis ...................................... 56/17.2 |
| 2,857,725 | 10/1958 | Canfield . |
| 2,948,544 | 8/1960 | Rowe et al. . |
| 3,382,653 | 5/1968 | De Buigne . |
| 4,167,093 * | 9/1979 | Pfeiffer et al. ......................... 56/17.2 |
| 4,224,785 * | 9/1980 | Hoch ..................................... 56/17.4 |
| 4,320,616 * | 3/1982 | Marto .................................... 56/17.2 |
| 4,321,784 | 3/1982 | Wood et al. . |
| 4,368,806 | 1/1983 | Raineri . |
| 4,835,952 | 6/1989 | McLane . |
| 4,870,811 | 10/1989 | Steele . |
| 4,942,726 * | 7/1990 | Bowditch .............................. 56/17.2 |
| 5,020,310 | 6/1991 | Oshima et al. . |
| 5,065,568 * | 11/1991 | Braun et al. .......................... 56/17.1 |
| 5,210,998 | 5/1993 | Hojo et al. . |
| 5,269,125 | 12/1993 | Langley, Sr. et al. . |
| 5,297,379 | 3/1994 | Smith . |
| 5,355,664 | 10/1994 | Zenner . |
| 5,463,855 | 11/1995 | Johnson et al. . |
| 5,526,633 * | 6/1996 | Strong et al. ......................... 56/17.2 |
| 5,653,096 | 8/1997 | Edwards . |
| 5,778,488 * | 7/1998 | Tsai ......................................... 16/34 |
| 5,797,252 * | 8/1998 | Goman ................................. 56/17.2 |
| 5,899,469 * | 11/1999 | Pinto et al. .......................... 16/35 R |
| 5,988,323 * | 11/1999 | Chu ...................................... 16/35 R |

FOREIGN PATENT DOCUMENTS

| | | |
|---|---|---|
| 2487497 | 12/1987 | (AU) . |
| 31 36 203 | 9/1981 | (DE) . |
| 295 08 100 U | 5/1995 | (DE) . |
| 297 12 138 U | 7/1997 | (DE) . |
| 0111725 | 11/1983 | (EP) . |
| 0367891 | 2/1989 | (EP) . |
| 0625434 | 5/1994 | (EP) . |
| 0714648 | 6/1996 | (EP) . |
| 2252802 | 11/1973 | (FR) . |

(List continued on next page.)

Primary Examiner—Thomas B. Will
Assistant Examiner—Nathan Mammen
(74) Attorney, Agent, or Firm—Harness, Dickey & Pierce, P.L.C.

(57) ABSTRACT

A lawn mower comprises a cutting deck 2 mounted on a castor wheel assembly 4 via a height adjustment mechanism. The height adjustment mechanism comprises a two part system having a first part mounted on the cutting deck 2 and a second part that is mounted on the castor wheel assembly 4 and which is slidably disposed in a vertical direction on the first part. The height adjustment mechanism also includes a locking mechanism, for example a cam or crank, which is capable of releasably locking the first part and the second parts of the height adjustment in any of a plurality of positions. The two part system comprises a sleeve 12 mounted on one part and which is rotatably mounted upon and axially slidable along a rod 20 mounted on the other part. The locking mechanism locks the sleeve in a plurality of axial positions along the rod 20 whilst allowing the sleeve 12 to freely rotate about the rod 20.

52 Claims, 12 Drawing Sheets

FOREIGN PATENT DOCUMENTS

| | | |
|---|---|---|
| 878834 | 10/1961 | (GB) . |
| 919689 | 2/1963 | (GB) . |
| 1199310 | 12/1967 | (GB) . |
| 1141011 | 1/1969 | (GB) . |
| 1363341 | 7/1972 | (GB) . |
| 1597925 | 9/1981 | (GB) . |
| 2221373 | 2/1990 | (GB) . |
| 2293095 | 3/1996 | (GB) . |
| 2327916 | 2/1999 | (GB) . |
| 9609752 | 4/1996 | (WO) . |
| 9628011 | 9/1996 | (WO) . |

* cited by examiner

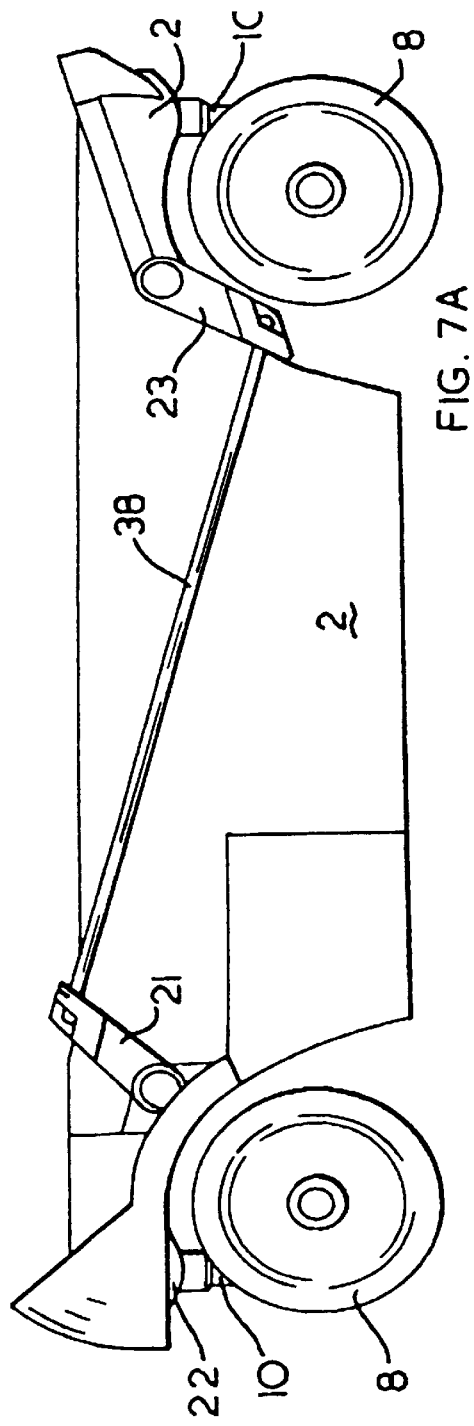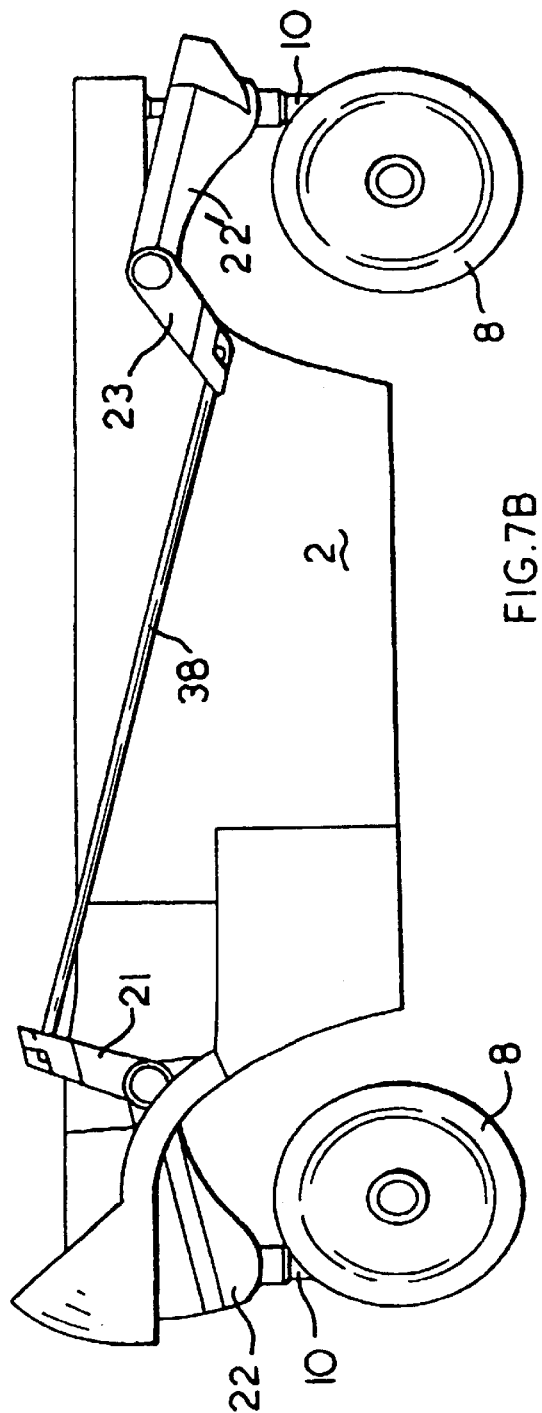

LAWN MOWER ADJUSTMENT MECHANISM

BACKGROUND OF THE INVENTION

The present invention relates to lawn mowers and, in particular, to lawn mowers mounted on castor wheels.

Household lawn mowers comprise a cutting deck upon which is mounted a motor. The motor can be either an electric motor powered by either a mains electricity supply or a battery or an internal combustion engine. The motor rotatingly drives a cutting blade mounted below the cutting deck about a substantially vertical axis, which cuts the grass beneath the deck as it rotates. The cutting deck is commonly mounted on wheels or rollers, having a fixed direction of travel so that the lawn mower moves over the lawn in a forward and reverse direction.

It is desirable to have the height of the cutting blade adjustable in relation to the surface of the lawn which allows the grass to be cut to differing heights. One common way of achieving this is by having the cutting deck of the lawn mower mounted on the wheels or rollers in such a manner that the height of the deck, and hence the height of the cutting blade, is adjustable relative to the wheels.

Such mechanisms include mounting the axles of the wheels or rollers on the ends of levers which are pivotally mounted onto the deck and which are capable of being releasably locked into a plurality of angular positions. The height of the cutting deck in relation to the wheels or rollers is dependent upon the angle of pivot of the levers. Interconnecting bars can be added between the levers to ensure that the height adjustment of interconnected wheels is uniform.

In order to increase the maneuverability of the mower, it is known to mount the cutting deck of a lawn mower on castor wheels which can freely swivel through 360° instead of wheels or rollers which have a predetermined fixed direction of travel. This allows the cutting deck of the mower to travel in any direction, both linearly and rotationally.

It is desirable to mount the cutting deck on the castor wheels in such a manner that the height of the cutting deck in relation to the surface of the lawn is adjustable in a similar fashion to that of mower having the cutting deck mounted on wheels which have a fixed direction of travel. However, the mechanisms which are commonly used to mount standard wheels so that they are adjustable in height cannot be utilized to mount castor wheels in a similar manner. This is due to the requirement of having to maintain the axes of swivel of the castor wheels vertical regardless of the height setting of the castor wheels in relation to the cutting deck.

AU 24874/97 discloses a lawn mower having a cutting deck mounted on castor wheels. The height of the deck is adjustable relative the castor wheels. The height adjustment mechanism comprises two parallel levers which are both pivotally attached to the deck at one end and which are also both pivotally attached to the stem of the castor wheel at the other end. The two levers form a parallelogram with the stem of the castor wheel and the deck such that the stem and thus the axis of swivel of the castor wheel remains vertical regardless of the angular position of the two levers. A rotatable threaded shaft is provided for adjusting and maintaining the angular position of the two levers.

However, the design of the height adjustment mechanism disclosed in AU 24874/97 is complicated and requires a substantial amount of space to provide a sufficiently large region through which the castor wheel can sweep to allow it to travel through its full range of pivot.

SUMMARY OF THE INVENTION

According to the first aspect of the present invention there is provided a lawn mower comprising a cutting deck mounted on a castor wheel assembly via a height adjustment mechanism. The height adjustment mechanism comprises a two part system having a first part mounted on the cutting deck and a second part that is mounted on the castor wheel assembly and that is slidably disposed on the first part. The height adjustment mechanism further includes a locking mechanism for releasably locking the first part and the second parts of the height adjustment in any of a plurality of positions.

The second part can be slidably disposed on the first part by means mounted on one part which sliding engages corresponding means mounted on the other part. Such sliding mechanisms can include rails or grooves or tracks, either on the cutting deck or castor wheel assembly and along which the castor wheel or cutting deck respectively slides. Such a design can provide a very simple and robust construction of sliding mechanism which requires little space.

The relative sliding movement between the first and second part can be vertical. This is able to produce the most compact design.

The height adjustment can comprise a sleeve mounted on one part and which mounted upon and axially slidable along a rod mounted on the other part.

When the height adjustment mechanism comprises a rod and sleeve the locking mechanism ideally is capable of releasably locking the sleeve in a plurality of axial positions along the rod whilst allowing the sleeve to freely rotate about the rod.

This can provide a simple design of sliding mechanism. Furthermore, when the rod is vertical, as the sleeve is capable of rotating about the rod in addition to sliding along the rod, the rod and sleeve can provide the mechanism by which the castor wheel is able to swivel, in addition to providing a sliding mechanism. This can simplify the design as it obviates the need for the castor wheel to have separate means which enable it to swivel.

When a single rod is used in conjunction with a sleeve, it is desirable that there is a substantial overlap between the vertical rod and the sleeve throughout the full range of axial positions of the sleeve along the rod. When the lawn mower is moved across the ground, substantial forces can be exerted on the castor wheel due to the inconsistent terrain. As such, substantial forces can be transmitted between the sleeve and the rod particularly in a direction perpendicular to the longitudinal axis of the rod. Therefore, sufficient overlap can ensure that the sleeve or rod do not break or bend.

The locking mechanism can comprise an arrangement for converting rotational motion to translational motion. One such arrangement comprises a rotatable cam mounted on one part which interacts with a cam follower mounted on the other part and which is configured so that the relative positions of the two parts is dependent on the angular position of the cam.

The use of a cam mechanism within the height adjustment mechanism can produce a simple yet compact design of locking mechanism which is cheap and simple to manufacture, yet is easy to operate.

The use of a cam can provide a mechanism by which both the axial position of the sleeve is locked and by which the sleeve is moved along the rod.

Preferably, the cam is releasably lockable in a plurality of angular positions. By making the cam releasably lockable, the cam can be used to maintain the height of the cutting deck above the castor wheel, thus avoiding the need for additional mechanisms to maintain the height of the cutting deck.

The cam can either be a lever or a snail cam.

One particular design of height adjustment mechanism comprises a cam having an elongate slot and a cam follower having at least one groove which engages with and is capable of sliding along the edge of the elongate slot and which is configured so that rotational movement of the cam results in a sliding movement of the cam follower along the elongate slot. This provides a simple method of attaching the cam to the cam follower whilst allowing the cam follower to freely slide along the cam. Ideally, the cam follower comprises a single 360° groove which allows the cam follower to freely rotate within the elongate slot.

An alternative design of locking mechanism comprises a rotatable crank mounted on one part which interacts with the other part and which is configured so that the relative positions of the two parts is dependent on the angular position of the crank.

The use of a crank instead of a cam provides an alternative way in which the height of the mower can be adjusted but which operates in a similar manner to a cam whilst still producing a simple and yet compact design.

Preferably the crank is releasably lockable in a plurality of angular positions.

According to the second aspect of the present invention a lawn mower comprises a cutting deck mounted on a castor wheel assembly via a height adjustment mechanism. The height adjustment mechanism comprises a guide mechanism which controls the direction of movement of the castor wheel assembly relative to the deck. The height adjustment mechanism includes a two part system, a first part mounted on the cutting deck and a second part mounted on the castor wheel assembly, and a locking mechanism which comprises an arrangement for converting rotational motion into translational motion.

The locking mechanism can comprise a rotatable cam mounted on one part which interacts with a cam follower mounted on the other part and which is configured so that the height of the cutting deck is dependent on the angular position of the cam. Alternatively, the locking mechanism can comprise a rotatable crank mounted on one part which interacts with the other part and which is configured so that the height of the cutting deck is dependent on the angular position of the crank.

The cam or crank is releasably lockable in a plurality of angular positions and can comprise a lever. Where a cam is used, it can comprise a snail cam as instead of a lever.

The cam can comprise an elongate slot and the cam follower comprises at least one groove which engages with and is capable of sliding along the edge of the elongate slot, rotational movement of the cam resulting in a sliding movement of the cam follower along the elongate slot. Ideally, the cam follower comprises a single 360° groove which allows the cam follower to freely rotate within the elongate slot.

The guide mechanism could comprise two levers pivotally connected in parallel at both ends between the cutting deck and castor wheel to form a parallelogram as disclosed in AU 24874/97. However such a design is mechanically complex. Therefore, ideally the guide mechanism comprises means mounted on one part which slidingly engages corresponding means mounted on the other part.

One type of guiding mechanism comprises a sleeve mounted on one part which is rotatingly mounted upon and axially slidable along a substantially vertical rod mounted on the other part. Where such a guiding mechanism is used ideally there is a substantial overlap between the vertical rod and the sleeve throughout the full range of axial positions of the sleeve along the rod.

It is desirable to operate all the cranks on all the height adjustment mechanisms in unison so that the height of deck is raised in a uniform manner above the ground.

When the cutting deck is mounted on at least two castor wheel assemblies, each wheel assembly having a height adjustment mechanism comprising a cam or crank, the axes of rotation of the cams or cranks being substantially parallel, preferably the cams or cranks being interconnected so that the rotational movement of one cam or crank in one direction about its axis of rotation results in a rotational movement of the other cam or crank about its axis of rotation in the opposite direction.

Each of the pivoting mechanisms can be configured so that they raise the height of the deck by substantially equal amounts when pivoted through any part of their full range of pivotal movement.

Preferably, one cam or crank is pivotally connected at a point away from its axis of rotation to an end of an interconnecting bar and that the other cam or crank is pivotally connected at a point away from its axis of rotation to the other end of the interconnecting bar. The use of an interconnecting bar provides a simple mechanism by which one castor wheel assembly can be connected to another castor wheel assembly.

The length of the interconnecting bar can be less than the distance between the axes of pivot of the pivoting mechanisms.

Where an interconnecting bar is used, ideally, in a direction parallel to a plane which passes through both axes of rotation of the cams or cranks the point at which the interconnecting bar pivotally connects to one cam or crank is located in the opposite direction from the axis of rotation of that cam or drank to the other point where the bar pivotally connects to the other cam or drank from the axis of rotation of the second cam or crank. This allows the length of the bar to be kept to a minimum.

Each cam or crank can be pivotally connected to the interconnecting bar via a rod which is rigidly attached to the cam or crank and which projects perpendicularly away from the axis of rotation of the cam or crank.

The two rods can, in a direction perpendicular to the plane which passes through both axes of rotation of the cams or cranks, project in opposite directions to each other and preferably, towards each other.

The cams or cranks can comprise levers, the levers being configured to move as a mirror image of each other in the plane located equidistantly between the two axes of rotation of the cams or cranks. Ideally, the levers project from their axis of rotation in a direction parallel to a plane which passes through both axes of rotation away from each other.

BRIEF DESCRIPTION OF THE DRAWINGS

Five embodiments of the present invention will now be described with reference to the following drawings of which:

FIGS. 7A and 7B show the deck of the mower in its lowered and raised positions respectively;

FIGS. 12B, 12D and 12F are cross sectional views taken along lines 12B—12B, 12D—12D and 12F—12F, respectively of FIG. 12A.

DESCRIPTION OF THE PREFERRED EMBODIMENTS

Figure 1:
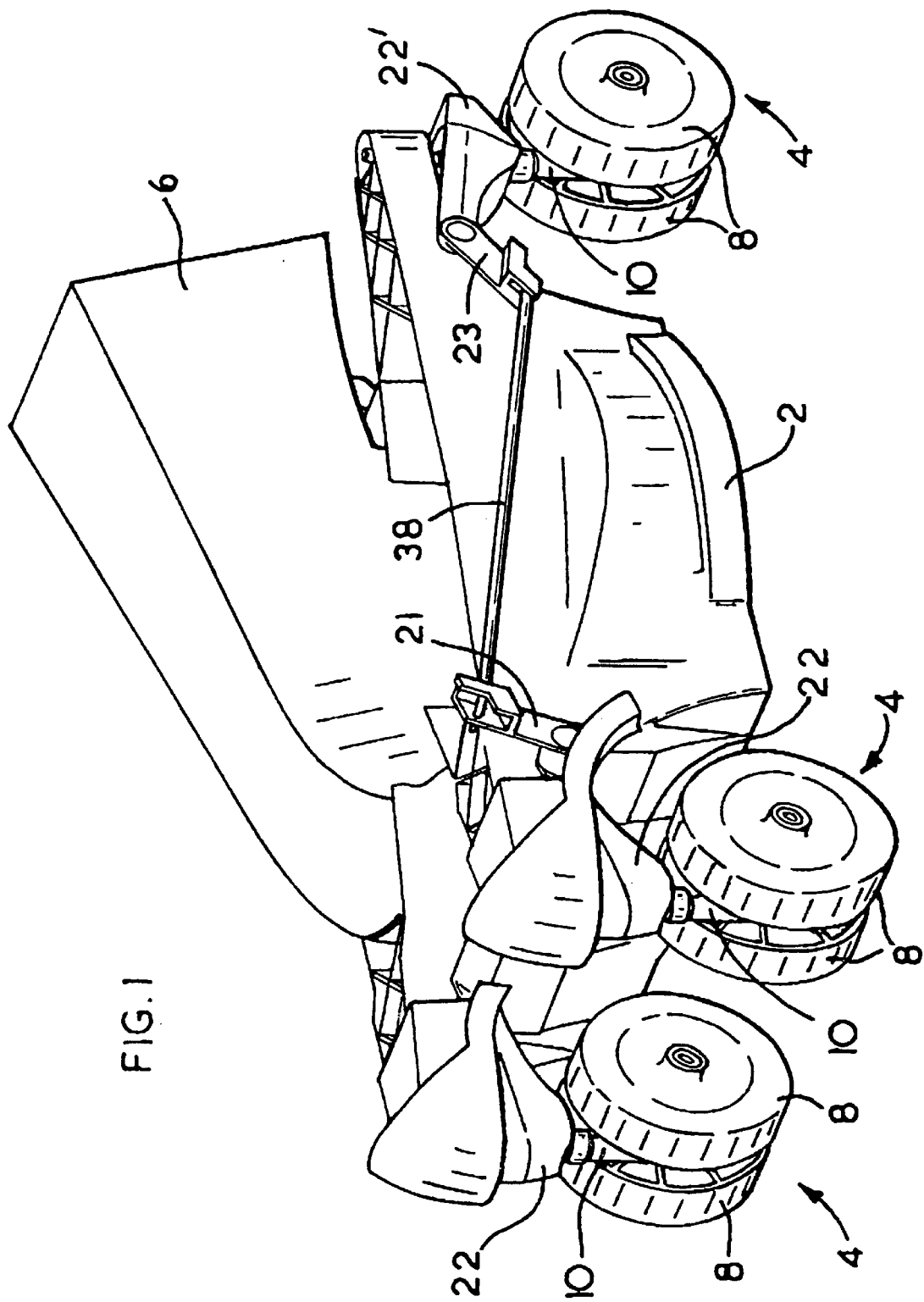
FIG. 1 shows the cutting deck of a lawn mower mounted on four castor wheels.

Referring to FIG. 1, the cutting deck 2 or frame of the lawn mower is mounted on four castor wheels 4 located near to the four corners of the deck 2, upon which is mounted an electric motor not shown and a hood not shown which encloses the motor. The motor rotatingly drives a cutting blade not shown mounted below the deck on the output drive spindle of the motor about a substantially vertical axis in known fashion. A grass chute 6 is mounted on top of the cutting deck 2 which directs the grass cuttings from the cutting blade to a grass box not shown which attaches to the rear of the cutting deck 2. A height adjustment mechanism is attached to the mower which raises or lowers the height of the cutting deck 2 in relation to the castor wheels 4, hence lifting or lowering the height of the cutting blade in relation to the ground below the mower.

Each of the four castor wheels 4 of the mower and its corresponding height adjustment mechanism are constructed and operate in the same manner.

Figure 2:
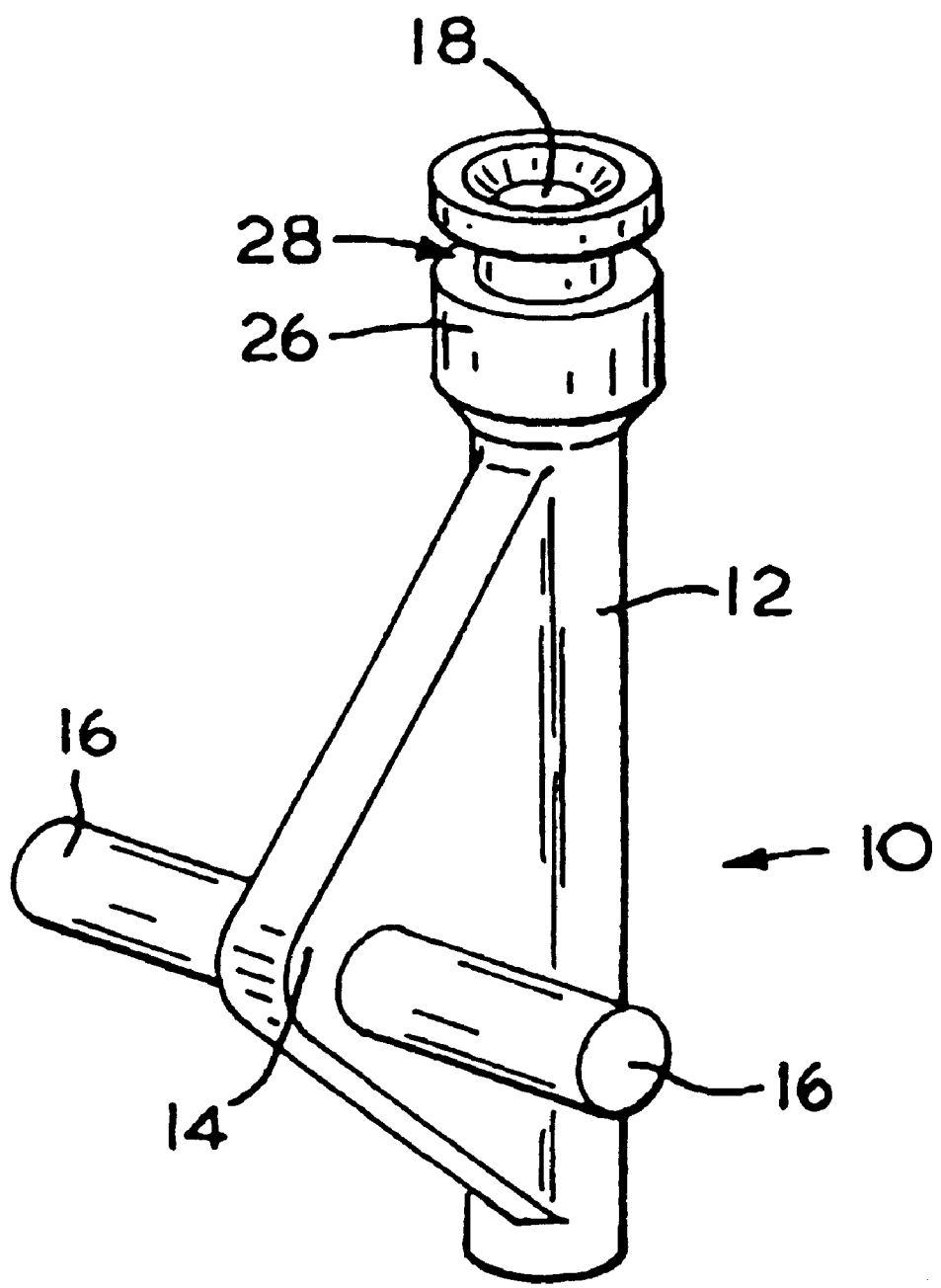
FIG. 2 shows the central mount of a castor wheel.

As can be seen in FIG. 1, each castor wheel 4 comprises two wheels 8 of equal dimensions which are mounted on a central mount 10 adjacent to each other and which have the same axis of rotation. FIG. 2 shows the central mount 10 which comprises a vertical sleeve 12, a vertical triangular flange 14 attached to the side of the base of the sleeve 12 and two shafts 16 of circular cross section which project perpendicularly from the sides of the triangular flange 14 in opposite directions. The sleeve 12 forms a bore 18 of circular cross section which is sealed at the base end. The two horizontal shafts 16 form axles upon which the two wheels 8 are mounted. The wheels 8 are retained upon the axles 16 by means of a clip not shown and are able to freely rotate about the axles 16. The central mount 10 is formed from a low friction plastic in a one piece construction.

Figure 4:
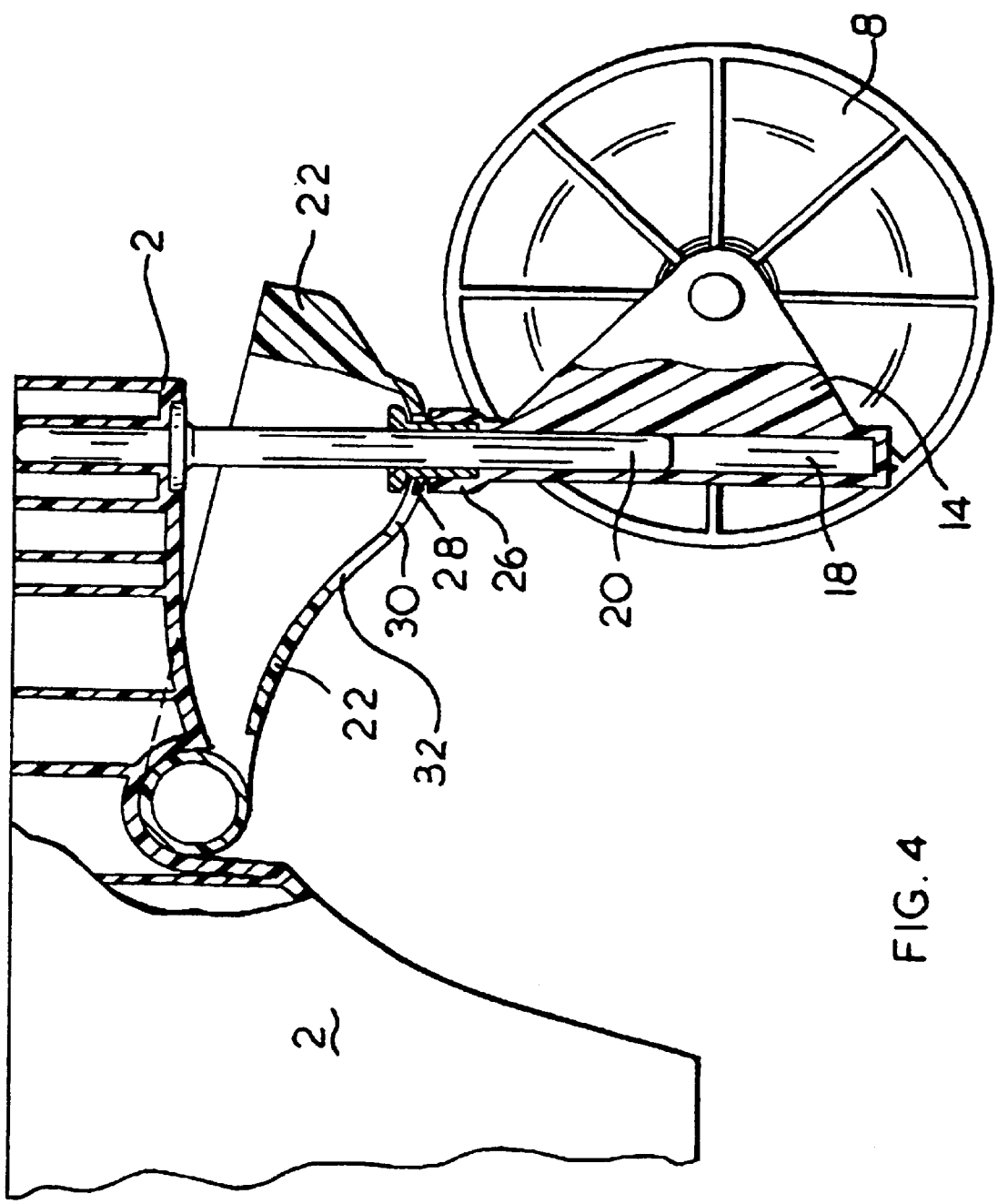
FIG. 4 shows a vertical section of the height adjustment mechanism, the cutting deck and the caster wheel when the height of the deck is at its maximum.
Figure 5:
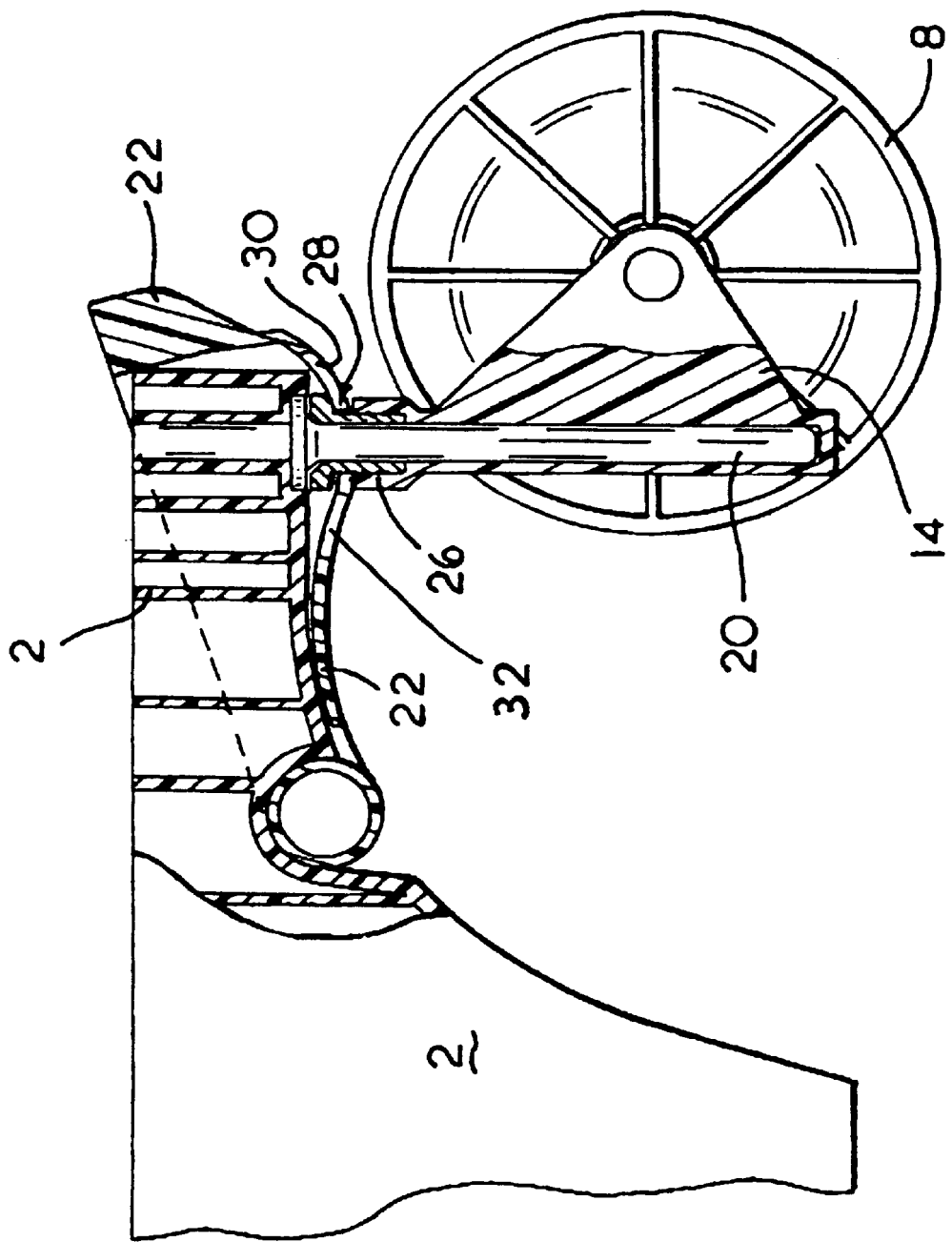
FIG. 5 shows a vertical cross section of the height adjustment mechanism, the cutting deck and the castor wheel when the height of the deck is at its minimum.

Each castor wheel 4 is mounted on a metal rod 20 which is rigidly attached to and projects vertically downwards from the underside of the cutting deck 2 as best shown in the cross sectional drawings shown at FIGS. 4 and 5. The metal rod 20 has a circular cross section having a diameter which is slightly less than that of the bore 18 of the central mount 10. The metal rod 20 is located within the bore 18 of the central mount 10, the central mount 10 being able to freely slide along and rotate about the metal rod 20.

Figure 3A:
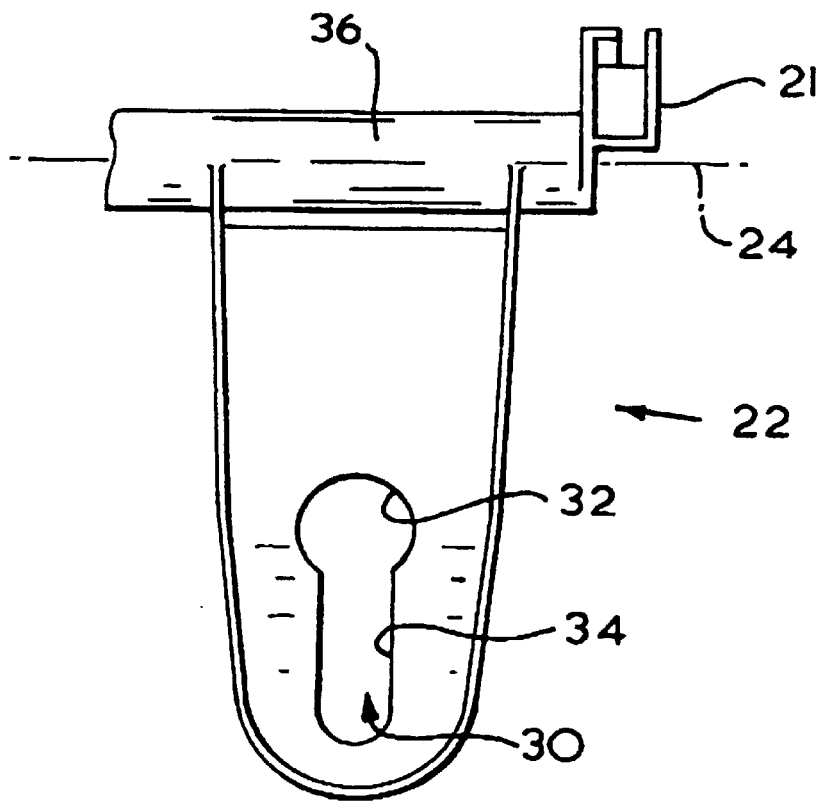
FIGS. 3A and 3B show the pivotal lever from above and in perspective respectively.
Figure 3B:
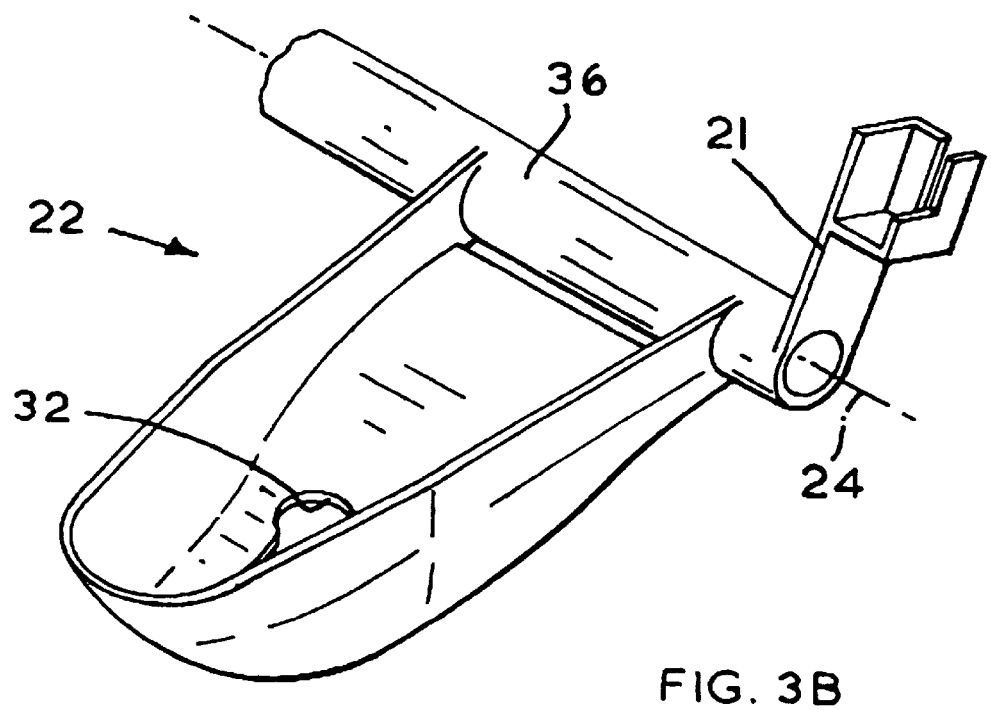

The height adjustment mechanism for each castor wheel 4 comprises a lever 22 which is pivotally mounted on the cutting deck 2 about an axis of pivot 24. FIGS. 3A and 3B show the pivotal lever 22. The lever is slidably attached to the sleeve 12 of the castor wheel 4 and acts as a cam, sliding the central mount 10 back and forth along the rod 20 as the lever 22 pivots in either direction, as shown in FIGS. 4 and 5.

A collar 26 is formed around the top of the sleeve 12 of each castor wheel 4 as best shown in FIG. 2. A groove 28 is formed around the outer periphery of the collar 26. The pivotal lever 22 is trough shaped as best shown in FIG. 3B. An elongate slot 30 is formed along the length of the lever 22 in the base of the trough. At one end of the elongate slot 30, towards the axis of pivot 24 of the lever 22, a large aperture 32 has been formed resulting in an overall key shaped slot. The diameter of the large aperture 32 in the lever 22 is greater than that of the outer circumference of the collar 26. The width of the elongate slot 30 is less than the diameter of the outer circumference of the collar 26 but less than the diameter of the circumference of the groove 28.

The sleeve 12 of the central mount 10 of the castor wheel 4 is attached to the lever 22 by passing the top end of the sleeve 12, having the entrance to the bore 18, through the large aperture 32 until the groove 28 formed around the collar 26 becomes aligned with the elongate slot 30 in the lever 22. The thickness of the lever 22 around the edge 34 of the elongate slot 30 is less than the width of the groove 28. The collar 26 is moved along the length of the lever 22, the edge 34 of the elongate slot 30 entering into and sliding through the groove 28. The sleeve 12 is, therefore, able to slide back and forth along the lever 22 within the elongate slot 30. The groove 28 acts as a cam follower, sliding along the edge 34 of the elongate slot 30 as the lever 22 pivots. However, the collar 26 is prevented from being moved perpendicularly to apart from the slight movement due to the thickness of the edge 34 of the elongate slot 30 being less than the width of the groove 28 or withdrawn from, and hence detached from the lever 22 whilst the collar 26 is located within the elongate slot 30.

When the lawn mower is fully assembled the metal rod 20 is located within the bore 18 formed by the sleeve 12 and the collar 26 is located within the elongate slot 30 in the lever 22, such that the edge 34 of the elongate slot 30 are located within the groove 28 around the collar 26 as best shown in FIGS. 4 and 5.

The height of deck 2 above the castor wheel 4 is at its maximum when the lever 22 is pivoted in downward position, as best shown in FIG. 4. In this position the collar 26 is located at the end of the elongate slot 30 furthest away from the large aperture 32 and the axis of pivot 24 of the lever 22. The rod 20 is of sufficient length that part of the rod 20 still remains within the bore 18 of the central mount 10 when the deck 2 is at its maximum height. Sufficient overlap is provided between the rod 22 and the bore 18 i.e. the amount of rod 20 still located within the sleeve 12 when the central mount 10 is extended away from the cutting deck 2 by its maximum amount to provide a strong and sturdy interconnection between the sleeve 12 and the metal rod 20, particularly when the forces are applied to the castor wheel perpendicularly to the vertical axis of swivel.

When the height of the cutting deck 2 above the castor 4 is to be reduced, the lever 22 is pivoted in an upward direction, as best shown in FIG. 5. This moves the sleeve 12 and hence the central mount 10 along the rod 20, a greater proportion of the length of the rod 20 being located within the bore 18 of the sleeve 12. As the central mount 10 moves along the rod 20, the groove 28 slides along the sides 34 of the elongate slot 30 in the lever 22.

When the height of the cutting deck 2 above the castor is at its minimum as best shown in FIG. 5, the whole of the metal rod 20 is located within the bore 18 of the central mount 10. In this position the collar 26 of the central mount 10 is located towards the end of the elongate slot 30 closest to the large aperture 32. The large aperture 32 is located in such a position that the collar 26 is unable to slide far enough along the elongate slot 30 in order to enter into the large aperture 34 from the elongate slot 30 while the castor wheel 4 is adjusted through its full range of height positions.

The height of deck 2 above the castor wheel 4 is fixed by locking the angular position of the lever 22.

Because the groove 28 is formed around the full circumference of the collar 26, the central mount 10 and hence the castor wheel 4 is able to freely rotate about the rod 20 whilst the collar 26 is located within the elongate slot 30 within the lever 22.

Figure 6:
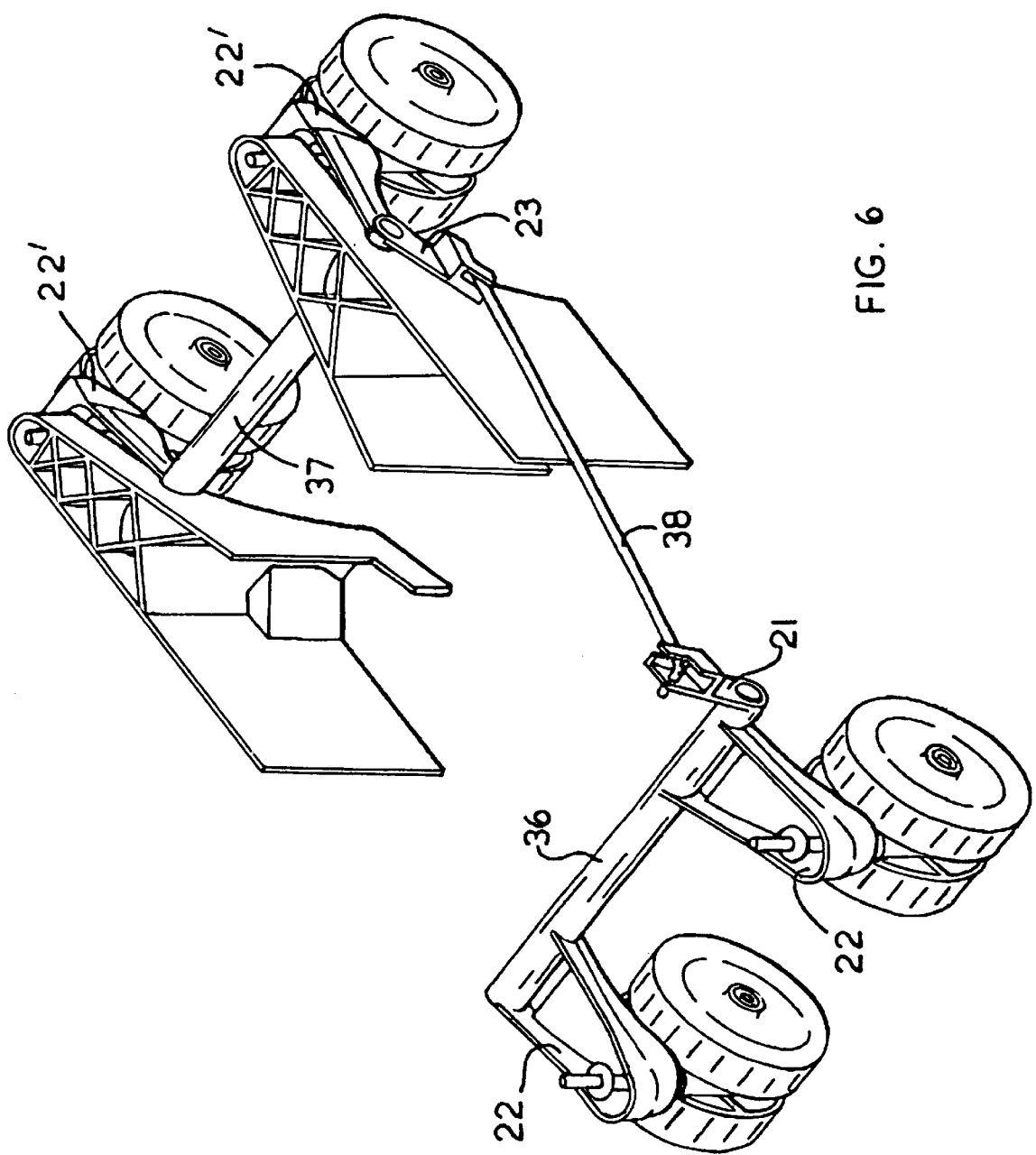
FIG. 6 shows a perspective view of the front pair of castor wheels together with corresponding pivotal levers to the ends of an interconnecting rod.

The two levers 22 which are connected to the front two castors 4 on the mower are rigidly attached in parallel to the two ends of a rod 36 perpendicularly to longitudinal axis of the rod 36 as best shown in FIG. 6. The rod 36 is mounted onto the underside of the cutting deck 2 by means of resilient clips not shown which wrap around and hold the rod 36. The clips are configured to allow the rod 36 to rotate about its longitudinal axis, thus enabling the two levers 22, attached to its ends, to pivot in unison about the longitudinal axis of the interconnecting rod 36.

The two levers 22 attached to the two rear castors 4 on the mower are similarly attached to the ends of a second rod 37 which is mounted in parallel to the first rod on the underside of the cutting deck 2 by resilient clips. Thus, the two rear levers 22 pivot in unison about the longitudinal axis of the second rod 37.

An interconnecting bar 38 is pivotally attached between one of the levers 22 connected to one of the front castors via a rod 21 rigidly attached to it and one of the levers 22 connected to one of the rear castors via a second rod 23 rigidly attached to the rear lever 2 so that all four levers 22 pivot in unison. The levers 22 attached to the front castor wheels 4 project forward in the opposite direction to the levers 22 attached to the rear castor wheels 4 which project rearward. The first rod 21 points in a general upward direction. The second points in a general downward direction. The interconnecting bar 38 pivotally attaches to the ends of the rods 21, 23 and is arranged so that clockwise rotation of the forward levers 22 results in an anti-clockwise rotation of the rear levers 22. This enables the height of the deck above all four castors to be kept constant, and that the height of the deck is adjusted in uniform manner above the four castor wheels. FIG. 7A shows the mower with the cutting deck 2 in its lowest position, FIG. 7B shows it in its highest position.

A handle can extend perpendicularly from one of the interconnecting rods. Pivotal movement of the handle by an operator pivots all four levers and this adjusts the height of the cutting deck and hence the cutting blade above the ground.

The height of the mower is maintained at the desired height by locking angular positions of the levers 22 by locking the angular position of the handle in well known manner.

A second embodiment of the present invention shall now be described with reference to FIGS. 8 and 9.

In the second embodiment each of the four castor wheels 4 of the mower and its corresponding height adjustment mechanism are constructed and operate in the same manner.

Figure 8:
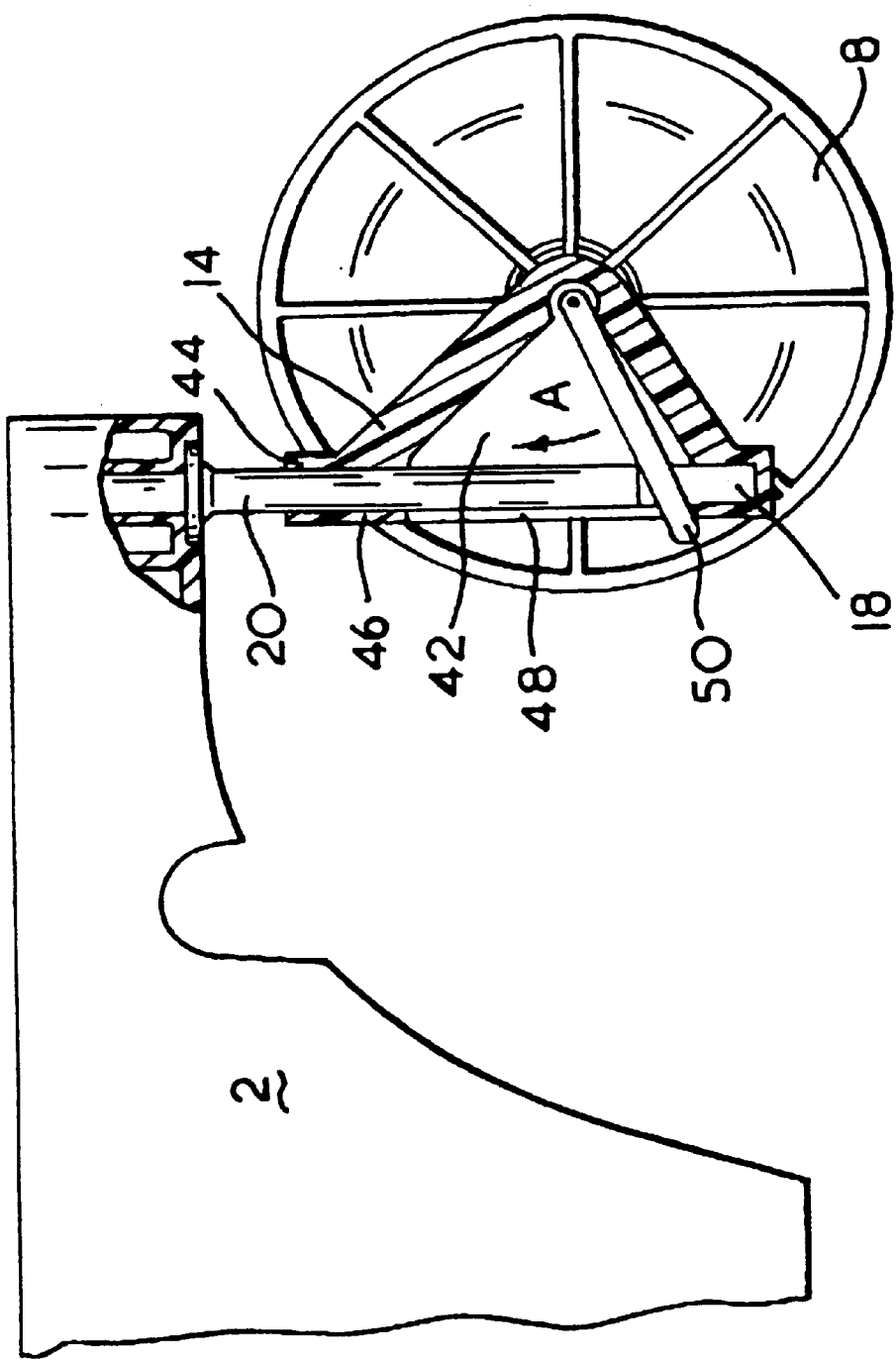
FIG. 8 shows the second embodiment of the present invention when the castor wheel is adjusted to its lowest position.
Figure 9:
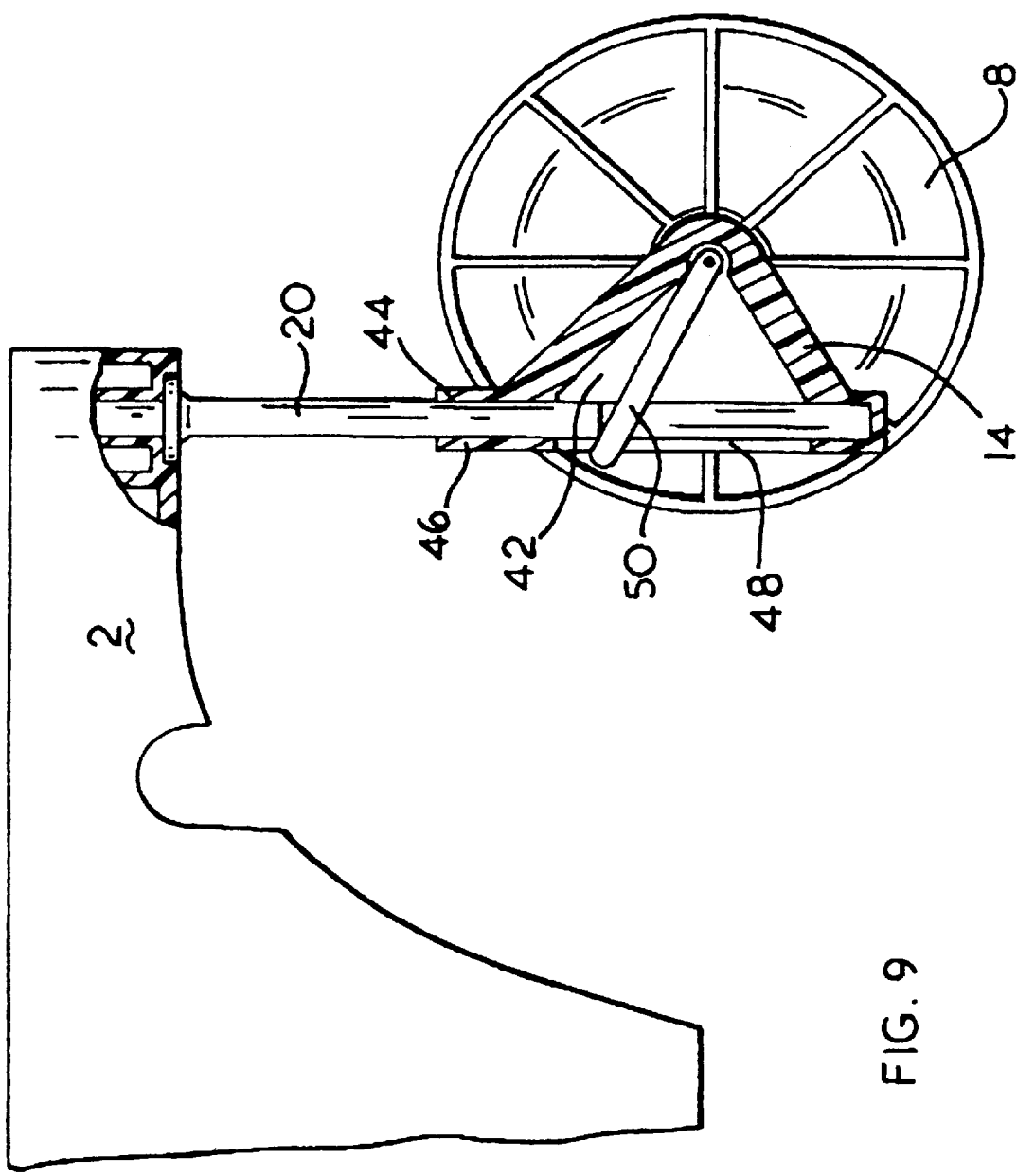
FIG. 9 shows the second embodiment of the present invention when the castor wheel is adjusted to its highest position.

Referring to FIGS. 8 and 9, each castor wheel 4 comprises a central mount 10 which is constructed in a similar manner to that described in the first embodiment and two wheels 8 mounted in a similar manner onto the central mount 10 to that described in the first embodiment. However, there is no collar 26 or groove 28 formed around the upper end of the sleeve 12. Furthermore, the triangular flange 14 is hollow, the triangular chamber 42 formed within the triangular flange 14 extending through the first inner wall 44 of the sleeve 12 to meet with the bore 18 formed by the sleeve 12 and through the second outer wall 46 of the sleeve 12 to form a vertical rectangular aperture 48 along the side of the sleeve 12. The thickness of the triangular chamber 42 is uniform.

A lever 50 is pivotally mounted at one of its ends within the triangular chamber 42, its axis of pivot being the same as the axis of rotation of the two wheels 8. The lever 50 extends from its axis of pivot through the triangular chamber 42, through the first inner wall 44 of the sleeve, through the bore 18, through the second outer wall 46 of the sleeve, through the rectangular aperture 48 and projects outwardly away from the sleeve 12. The range of pivotal movement of the lever is determined by two edges of the triangular chamber 42.

The castor wheel 4 is mounted onto the cutting deck 2 via a vertical metal rod 20 in a similar fashion to that disclosed in the first embodiment. However, as the metal rod 20 slides in the bore 18 of the sleeve 12, the end of the rod 20 engages with the lever 50 as shown in FIGS. 8 and 9. When the lever 50 is in its lowest position, as shown in FIG. 8 the maximum amount of rod 20 is located within the bore 18 and thus the cutting deck 2 is at its lowest position. Pivotal movement of the lever 50 in an upward direction, as indicated by Arrow A in FIG. 8 slides the rod 20 upwardly within the bore 18, reducing the amount of rod 20 located within the bore 20 thus raising the height of the cutting deck 2 above the castor wheel 4. As the lever 50 pivots, the end of the rod 20 slides along the length of the lever 50, the lever acting as a cam, the end of the rod 20 acting as the cam follower.

The height of the deck is located by locking the angular position of the lever 50 within the central mount.

The end of the metal rod 20, and the side of the pivotal lever 50 along which it slides, have a small interactive resistance allowing the castor wheel 4 to freely rotate about the metal rod 20 and the end of rod 20 to slide easily up and down the length of the pivotal lever 50.

When adjusting the height of the mower, each of the four levers 50 on the four castor wheels 4 is adjusted separately so that the cutting deck 2 is of an equal height above each of the four castor wheels 4.

A third embodiment of the present invention shall now be described with reference to FIG. 10.

In the third embodiment each of the castor wheels 4 of the mower and its corresponding height adjustment mechanism are constructed and operate in the same manner.

Figure 10:
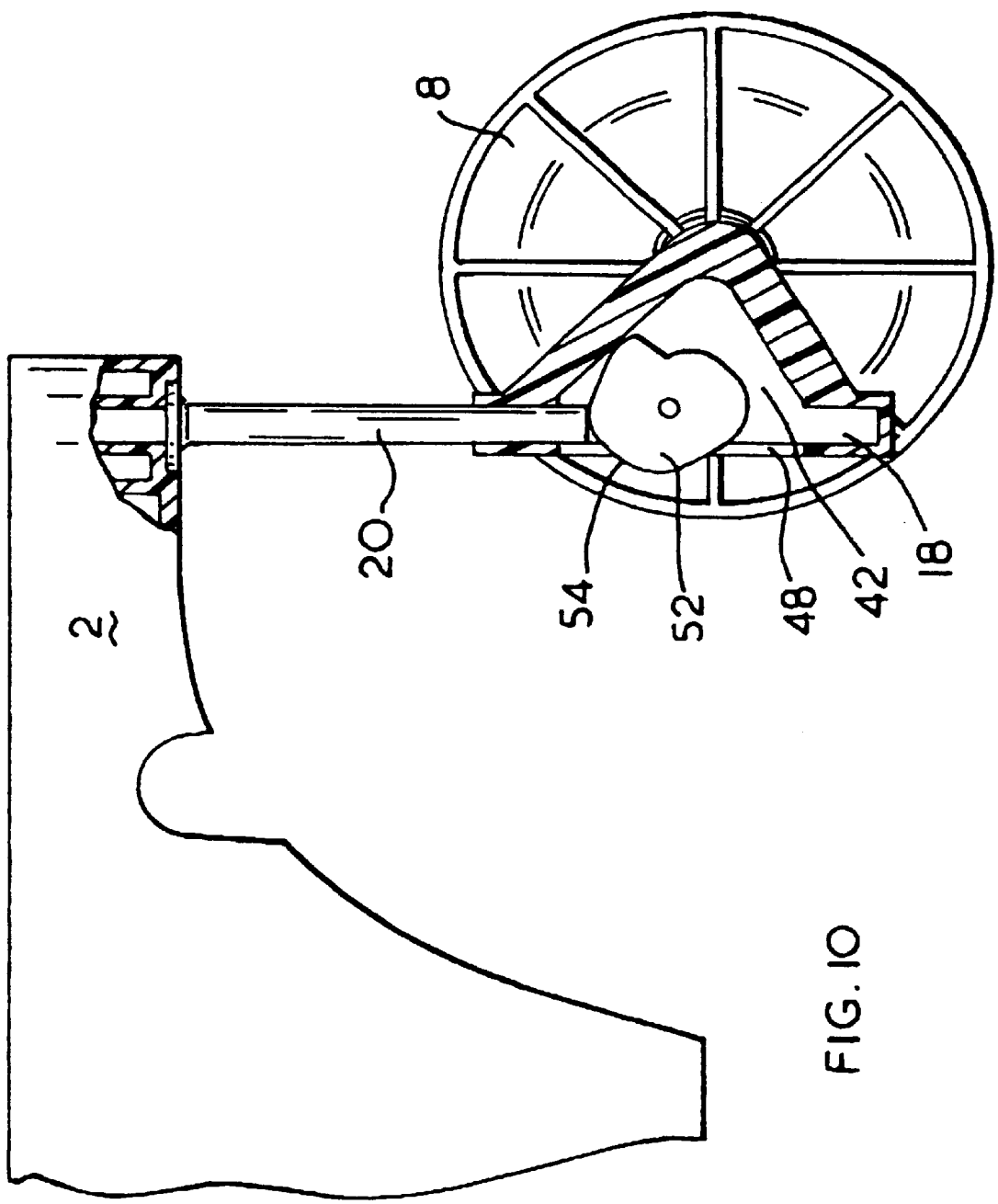
FIG. 10 shows the third embodiment of the present invention.

In the third embodiment of the present invention, as shown in FIG. 10 each castor wheel 4 and its height adjustment mechanism, is constructed in a similar manner to that of the second embodiment of the present invention. However, the lever 50 pivotally mounted within the central mount 10 is replaced by a snail cam 52 rotatingly mounted within the central mount as best shown in FIG. 10. The end of the metal rod 20 engages with the spiral edge 54 of the snail cam 52. Rotation of the snail cam 52 slides the metal rod 20 within the bore due to the spiral shape of the cam.

The height of the deck is fixed by locking the angular position of the snail cam 52 thus preventing it from rotational movement. The locking means can comprise clamping means which sandwich the snail cam 52 to hold it tight. Part of the snail cam 52 projects through the aperture 48 to enable a user to easily rotate the cam.

The end of the metal rod 30 and the spiral edge of the cam 52 along which it slides have a small interactive resistance allowing the castor wheel 4 to freely rotate and the end of the rod 20 to freely slide over the spiral edge 54 of the snail cam 52.

It will be apparent to a person skilled in the art that the snail cam as disclosed in the third embodiment can be replaced by a disk or similar such item which has a spiral groove or ridge which spiral outwards from the axis of rotation of the disk and which interacts with the end of the rod in a similar manner to that of the spiral edge of the snail cam so that rotation of the disk results in a sliding movement of the metal rod 20 within the bore 18.

Figure 11:
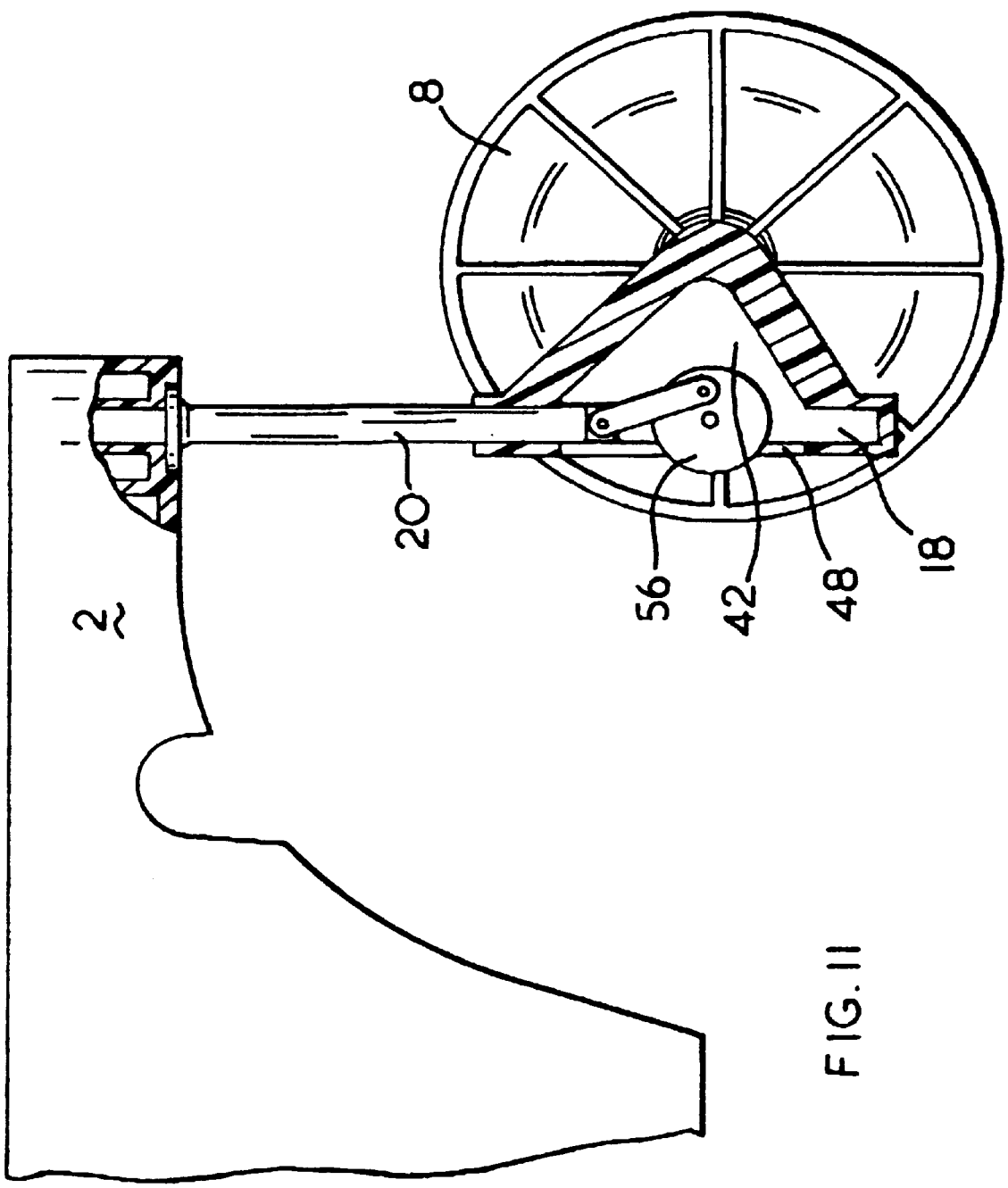
FIG. 11 shows the fourth embodiment of the present invention.

In the fourth embodiment of the present invention, as shown in FIG. 11, each castor wheel 40 and its height adjustment mechanism, is constructed in a similar manner to that of the second embodiment of the present invention. However, the lever 50 pivotally mounted within the central mount 10 is replaced by a crank 56 comprising a metal disk, rotatingly mounted within the central mount as best shown in FIG. 11. One end of a rod 58 connects pivotally to the end of the vertical metal rod 20. The other end connects eccentrically to the metal disk in a pivotal fashion. Rotation of the disk 52 slides the metal rod 20 within the bore 18 due to the movement of the rod 58 by the disk 52.

The height of the deck is fixed by locking the angular position of the disk 56 thus preventing it from rotational movement. The locking means can comprise clamping means which sandwich the disk 52 to hold it tight.

The connection between the end of the metal rod 30 and the rod 58 is such that it allows the castor wheel 4 to freely rotate the vertical metal rod 20.

It will be apparent to a person skilled in the art that the disk as disclosed in the fourth embodiment can be replaced by a lever or similar such item.

Figure 12A:
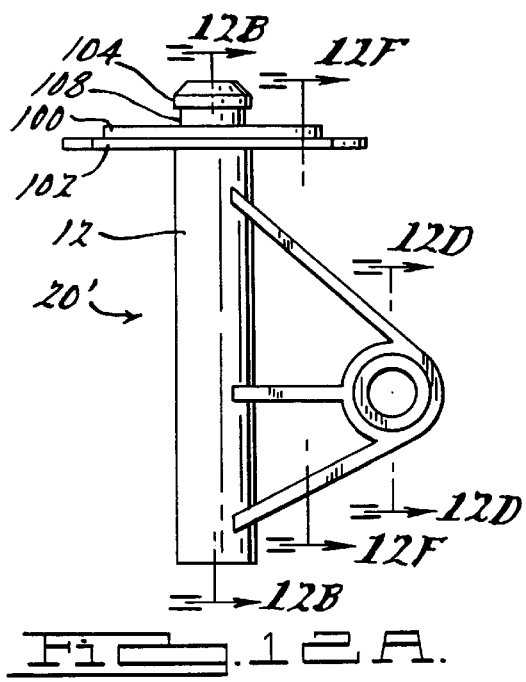
FIGS. 12A–12F show the central mount according to the fifth embodiment of the invention.
Figure 12B:
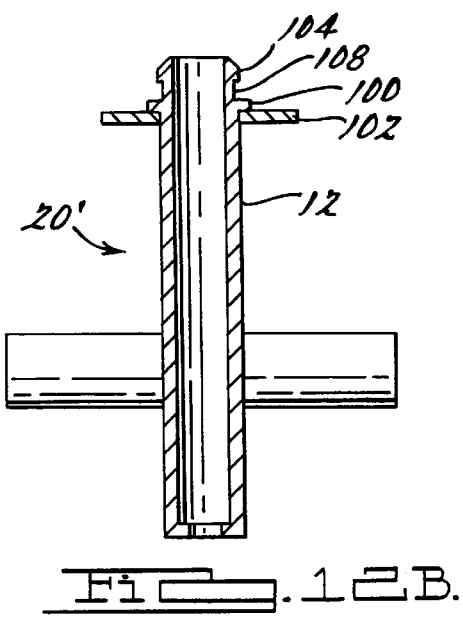
Figure 12C:
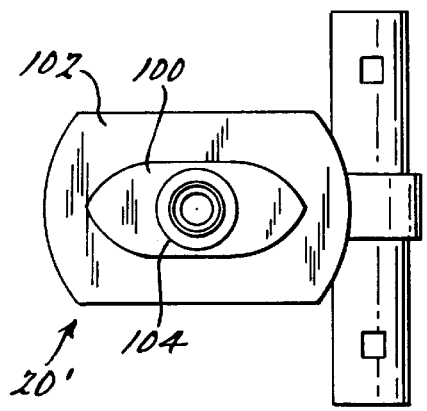
Figure 12D:
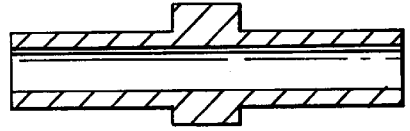
Figure 12E:
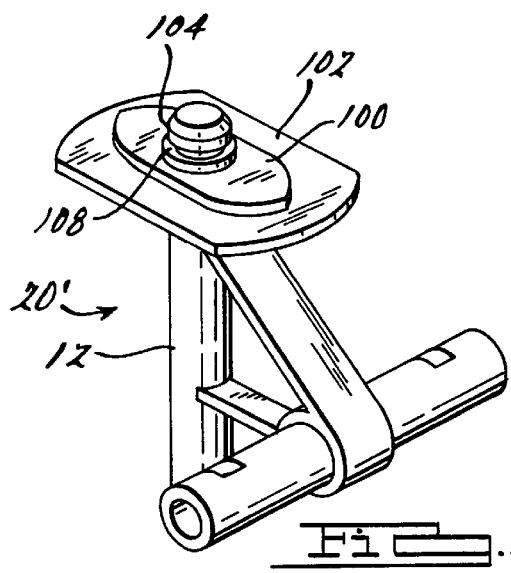
Figure 12F:
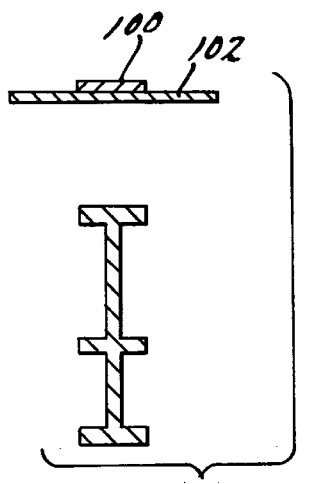

The fifth embodiment is the same as the first embodiment except that the central mount (20) of each castor wheel assembly disclosed in the first embodiment is replaced with a central mount (20') as disclosed in FIGS. 12A to 12C. The construction of the central mount (20') is similar to that described in the first embodiment. There is an elliptical shaped cam (100) and a flange (102) which has been added below the cam (100). The flange is integrally formed with the central mount (20'). The plane of the flange (102) is parallel to that of the cam, the flange (102) being adjacent to and abutting against the cam.

Around the top end of the sleeve is formed a lip (104). The lip in conjunction with the top surface of the cam form a groove (108) in a similar manner to groove (28) in the first embodiment of the invention. The central mount operates in the same manner as that disclosed in the first embodiment. However, the design of the lever (22) can be altered by omission of the large aperture (32), the lever (22) simply comprising an elongate slot (30). During construction the lip (104) of the central mount is forced through the elongate slot (30), the diameter of the lip being greater than the width of the elongate slot (30). As the lip (104) passes through the slot (30) the edge (34) of the slot (30) flexes, allowing the lip (104) to pass through. Once through, the edge (34) returns to its original position, entering into the groove (108) formed by the lip (104) and top surface of the cam.

What is claimed is:

1. A lawn mower comprising:
   a cutting deck defining a first part having an axis;
   a castor wheel assembly defining a second part rotatably engaging the first part for rotation of the castor wheel assembly on the axis, the second part slidably engaging the first part for axial movement of the second part with respect to the first part between a first and second position;
   a height adjustment mechanism mounting the cutting deck on the castor wheel assembly;
   the height adjustment mechanism comprises:
   an adjustment member rotatably secured on a horizontal axis to one of the cutting deck or the caster wheel assembly, the adjustment member engaging one of the first or second parts to cause generally vertical movement between the first and second parts,
   a locking mechanism for releasably locking the adjustment member to position the first part and the second part in any of a plurality of positions between said first and second positions so that the relative positions of the two parts is dependent on the angular position of the rotatable adjustment member.

2. The lawn mower of claim 1 wherein the axial movement between the first and second parts is vertical.

3. The lawn mower of claim 1 wherein the first part comprises a rod mounted on the cutting deck and the second part comprises a sleeve mounted on the caster wheel assembly.

4. The lawn mower of claim 3 wherein the locking mechanism is capable of releasably locking the sleeve in a plurality of axial positions along the rod and allows the sleeve to freely rotate about the rod.

5. The lawn mower of claim 4 wherein a substantial overlap is defined between the rod and the sleeve throughout the full range of axial positions of the sleeve along the rod.

6. The lawn mower of claim 1 wherein the adjustment member comprises an arrangement for converting rotational motion to translational motion.

7. The lawn mower of claim 1 wherein the adjustment member comprises a rotable cam mounted on the first part which interacts with a cam follower mounted on the second part and the locking mechanism is configured so that the relative positions of the two parts is dependent on the angular position of the rotatable cam.

8. The lawn mower of claim 7 wherein the rotatable cam is releasably lockable in a plurality of angular positions.

9. The lawn mower of claim 7 wherein the rotatable cam comprises a lever.

10. The lawn mower of claim 7 wherein the rotatable cam comprises a snail cam.

11. The lawn mower of claim 7 wherein the rotatable cam comprises an elongate slot and the cam follower comprises at least one groove which engages and is capable of sliding along an edge of the elongate slot.

12. The lawn mower of claim 11 wherein the groove is a single 360° groove which allows the cam follower to freely rotate within the elongate slot.

13. The lawn mower of claim 1 wherein the adjusting member comprises a rotatable crank, mounted on the second part which interacts with the first part and the locking mechanism is configured so that the relative positions of the two parts is dependent on the angular position of the rotatable crank.

14. The lawn mower of claim 13 wherein the rotatable crank is releasably lockable in a plurality of angular positions.

15. A lawn mower comprising:
a cutting deck defining a first part having an axis;
a castor wheel assembly defining a second part rotatably engaging the first part for rotation of the castor wheel assembly on the axis, the second part slidably engaging the first part for axial movement of the second part with respect to the first part between a first and second position;
a height adjustment mechanism mounting the cutting deck on the castor wheel assembly;
the height adjustment mechanism comprising:
a guide mechanism for controlling the direction of movement of the castor wheel assembly relative to the deck; and
an adjustment member rotatably secured on a horizontal axis to one of the cutting deck or the caster wheel assembly, the adjustment member engaging one of the first or second parts to cause generally vertical movement between the first and second parts; and
a locking mechanism for releasably locking the adjustment member to position the first part and the second part in any of a plurality of positions between said first and second positions so that the relative positions of the two parts is dependent on the angular position of the rotatable adjustment member.

16. The lawn mower of claim 15 wherein the adjustment member comprises a rotatable cam mounted on the first part which interacts with a cam follower mounted on the second part and the locking mechanism is configured so that the height of the cutting deck is dependent on the angular position of the cam.

17. The lawn mower of claim 15 wherein the adjustment member comprises a rotatable crank mounted on the second part which interacts with the first part and the rotatable crank is configured so that the height of the cutting deck is dependent on the angular position of the rotatable crank.

18. The lawn mower of claim 16 wherein the rotatable cam is releasably lockable in a plurality of angular positions.

19. The lawn mower of claim 16 wherein the rotatable cam comprises a lever.

20. The lawn mower of claim 16 wherein the rotatable cam comprises a snail cam.

21. The lawn mower of claim 16 wherein the rotatable cam comprises an elongate slot and the cam follower comprises at least one groove which engages with and is capable of sliding along an edge of the elongate slot and rotational movement of the rotatable cam results in a sliding movement of the cam follower along the elongate slot.

22. The lawn mower of claim 21 wherein the cam follower comprises a single 360° groove which allows the cam follower to freely rotate within the elongate slot.

23. The lawn mower of claim 15 wherein the first part comprises a rod mounted on the cutting deck and the second part comprises a substantially vertical sleeve mounted on the castor wheel assembly.

24. The lawn mower of claim 23 wherein a substantial overlap is defined between the vertical rod and the sleeve throughout the full range of axial positions of the sleeve along the vertical rod.

25. The lawn mower of claim 1 wherein
the cutting deck is mounted on at least two castor wheel assemblies, each wheel assembly having a respective height adjustment mechanism, the height adjustment mechanism comprising
a first cam rotatable about a first axis;
a second cam rotatable about a second axis, parallel to the first axis; and
a connection between the first and second rotatable cams for rotating the first and second rotatable cams in opposite directions about the first and second axis respectively.

26. The lawn mower of claim 25 wherein the cams raise the height of the deck by substantially equal amounts when pivoted through any part of their full range of pivotal movement.

27. The lawn mower of claim 25 wherein the connection is a bar connected at one end to the first cam at a first point spaced from the first axes and connected at the other end to the second cam at a second point spaced from the second axis.

28. The lawn mower of claim 27 wherein the length of the bar is less than the distance between the first and second axes.

29. The lawn mower of claim 27 wherein, the first point is spaced from the first axis in a first direction parallel to a plane extending through the first and second axes; and
the second point is spaced from the second axis in a second direction opposite the first direction.

30. The lawn mower of claim 27 further comprising first and second rods, respectively, rigidly attached to the first and second pivoting mechanisms, respectively; and
the first and second pivoting mechanism connected to the bar via the first and second rods.

31. The lawn mower of claim 30 wherein, the first and second rods project opposite to each other relative to first plane perpendicular to a second plane extending through first and second pivot axes.

32. The lawn mower of claim 30 wherein the first and second rods project from the first and second pivot mechanisms generally toward each other.

33. The lawn mower of claim 25 wherein the the first and second cams comprise first and second levers, respectively, the first and second levers move as a mirror image of each other in a plane located equidistant from the first and second axis.

34. The lawn mower of claim 33 wherein: the first lever projects from the first axis in a first direction generally parallel to a plane extending through the first and second axis and the second lever projects in a second direction generally opposite to the first direction.

35. The lawn mower of claim 1 wherein the adjustment member comprises a rotatable cam mounted on the second part which interacts with the cam follower mounted on the first part and the locking mechanism is configured so that the relative positions of the two parts is dependent on the angular position of the rotatable cam.

36. The lawn mower of claim 15 wherein the adjustment member comprises of rotatable cam mounted on the second part which interacts with the cam follower mounted on the first part and the locking mechanism is configured so that the height of the cutting deck is dependent on the angular position of the cam.

37. The lawn mower of claim 15 wherein the adjustment member comprises of rotatable crank mounted on the second part which interacts with the first part and the rotatable crank is configured so that the height of the cutting deck is dependent on the angular position of the rotatable crank.

38. The lawn mower of claim 16 wherein the rotatable cam is releasably lockable and plurality of angular positions.

39. The lawn mower of claim 17 wherein the rotatable crank comprises a lever.

40. The lawn mower of claim 15 wherein the guide mechanism comprises means mounted on the second part which slidingly engaging corresponding means mounted on the first part.

41. The lawn mower of claim 25 wherein the connection is a bar connected at one end to the first cam at a first point spaced from the first axes and connected at the other end to the second cam at a second point spaced from the second axis.

42. The lawn mower of claim 15 wherein the cutting deck is mounted on at least two castor wheel assemblies, each wheel assembly having a height adjustment mechanism, the height adjustment mechanism comprising a first cam rotatable about a first axis;

a second cam rotatable about a second axis, parallel to the first axis;

a connection between the first and second rotatable cams for rotating the first and second rotatable cams in opposite directions about the first and second axis respectively.

43. The lawn mower of claim 42 wherein the cams raise the height of the deck by substantially equal amounts when pivoted through any part of their full range of pivotal movement.

44. The lawn mower of claim 42 wherein the connection is a bar connected at one end to the first cam at a first point spaced from the first axes and connected at the other end to the second cam at a second point spaced from the second axis.

45. The lawn mower of claim 42 wherein the length of the bar is less than the distance between the first and second axes.

46. The lawn mower of claim 44 wherein, the first point is spaced from the first axis in a first direction parallel to a plane extending through the first and second axes and the second point is spaced from the second axis in a second direction opposite the first direction.

47. The lawn mower of claim 44 further comprising first and second rods, respectively, rigidly attached to the first and second pivoting mechanisms, respectively; and the first and second pivoting mechanism connected to the bar via the first and second rods.

48. The lawn mower of claim 47 wherein, the first and second rods project opposite to each other relative to first plane perpendicular to a second plane extending through first and second pivot axes.

49. The lawn mower of claim 47 wherein the first and second rods project from the first and second pivot mechanisms generally toward each other.

50. The lawn mower of claim 42 wherein the first and second cams comprise first and second levers, respectively, the first and second levers move as a mirror image of each other in a plane located equidistant from the first and second axis.

51. The lawn mower of claim 42 wherein: the first lever projects from the first axis in a first direction generally parallel to a plane extending through the first and second axis and the second lever projects in a second direction generally opposite to the first direction.

52. The lawn mower of claim 30, wherein the first and second rods project perpendicularly from the first and second axes, respectively.

* * * * *